July 12, 1955 F. FAHRNI 2,712,842
APPARATUS FOR PRODUCING SHAVINGS
Filed Aug. 10, 1951 3 Sheets-Sheet 1

INVENTOR.
Fred Fahrni
BY Michael S. Struker

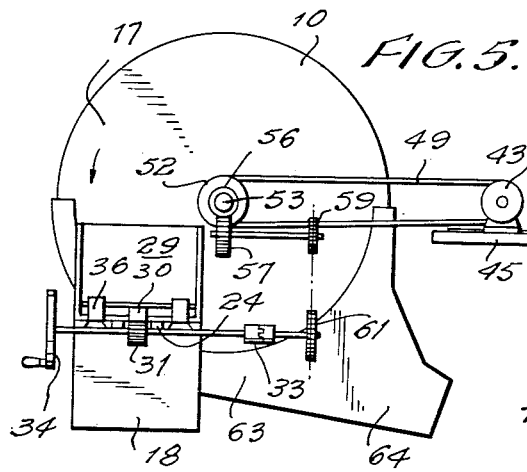
FIG. 5.
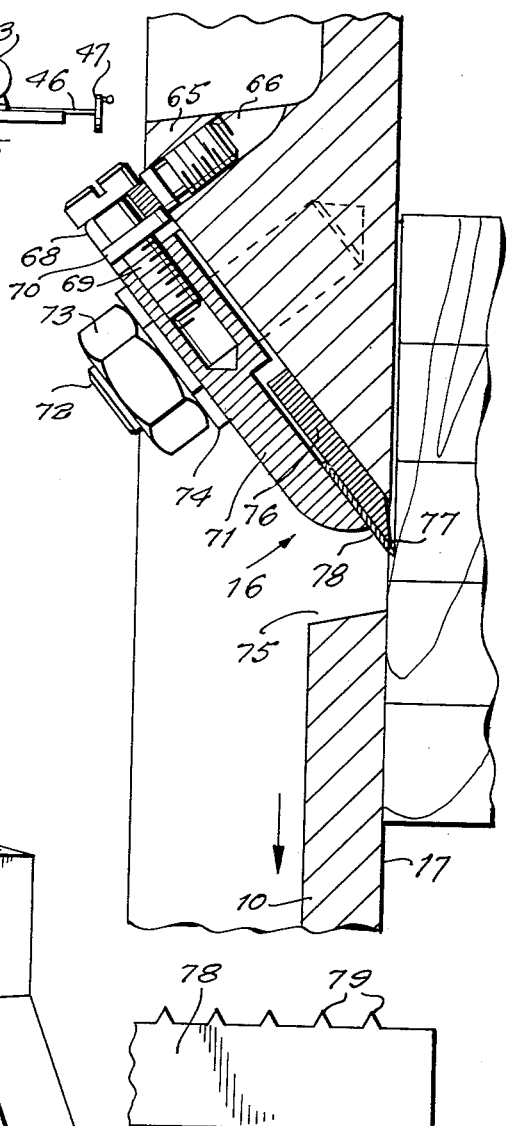
FIG. 3.
FIG. 4.
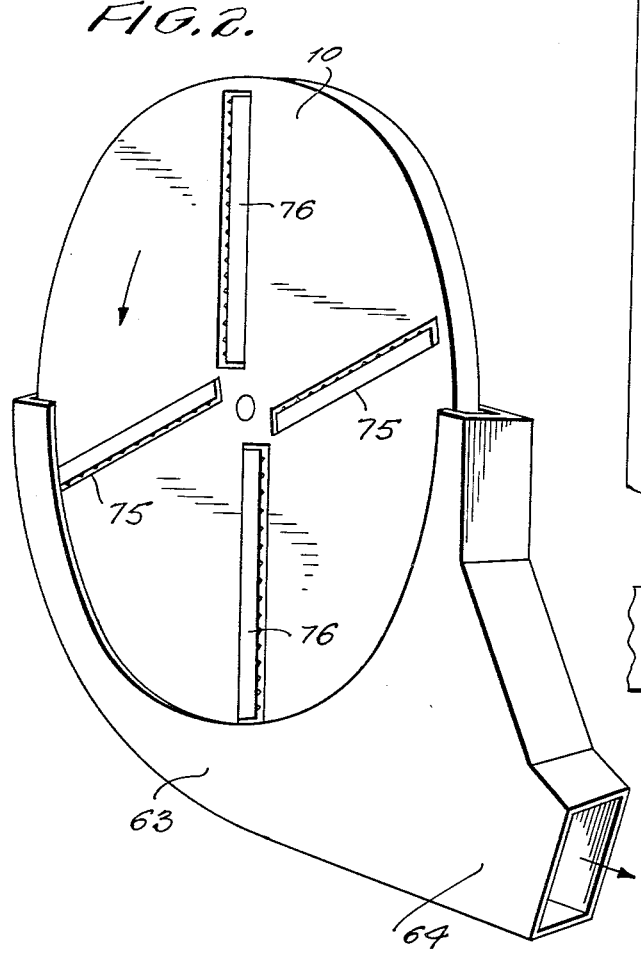
FIG. 2.
INVENTOR.
Fred Fahrni
BY Michael S. Striker INVENTOR.
Fred Fahrni
BY Michael S. Striker

United States Patent Office 2,712,842
Patented July 12, 1955

2,712,842

APPARATUS FOR PRODUCING SHAVINGS

Fred Fahrni, Zurich, Switzerland

Application August 10, 1951, Serial No. 241,312

4 Claims. (Cl. 144—162)

The present invention relates to a process and apparatus for producing shavings of desired shape and thickness.

One of the objects of the present invention is to provide a process and machine for producing shavings which will have desired shapes and thicknesses.

Another object of the present invention is to produce such shavings in a continuous manner.

A further object of the present invention is to provide a very simple process and apparatus for producing such shavings.

Still a further object of the present invention is to provide an apparatus which may be easily adjusted so as to change the size of the shavings produced.

An additional object of the present invention is to provide means for automatically stopping the feeding operation of the apparatus when the material to be cut into shavings has been cut to a predetermined extent.

Still another object of the present invention is to provide a means for removing the uncut portion of the material from the apparatus of the present invention.

Among the objects of the invention is also included a means for preventing jamming of the apparatus by too rapid a feed of the material to be cut into shavings.

With the above objects in view the present invention mainly consists of a cutting means for producing the shavings. This cutting means includes a shaving blade portion and a scoring blade portion. The cutting means is preferably mounted on a rotating disc and the cutting edge of the shaving blade portion projects from a face of the disc. The scoring blade portion includes a plurality of spaced groove-cutting projections which extend from the said disc face by a distance slightly greater than the distance of said cutting edge of said shaving blade portion from the disc face. The shaving blade portion and scoring blade portion of the cutting means may be included in a single unitary cutting means, or they may be separate elements which are mounted in contact with each other or spaced from each other. The scoring blade is located ahead of the shaving blade in the direction of rotation of the disc, and the entire cutting means is located on one side of the center of the disc. The shaving blade is preferably mounted parallel to but spaced from a radius of the disc. It is preferred that a plurality of cutting means be mounted in equally spaced relation on the disc.

The material to be cut is continuously fed to the disc so that the cutting means thereon will cut shavings from the same. The scoring blade cuts a plurality of grooves in the material, and the shaving blade cuts off a layer of the material which is of a thickness less than the depth of the grooves so that one dimension of the shavings is determined by the distance between the grooves. The other dimension of the shavings is determined by the thickness of the pieces of cut material which are preferably mounted on each other, and the thickness of the shavings is determined by the distance of the cutting edge of the shaving blade from the face of the disc.

The material being cut is supported adjacent to the disc by a movable extension of a table top upon which the material is mounted, and when the material has been cut to a predetermined extent this extension of the table top is automatically moved away from the disc and from beneath the material so that the remaining uncut material may fall to the floor to be later picked up. Simultaneously with the movement of this extension of the table top away from the disc, the operation of the feeding means is stopped so that there will be no further feeding of the material toward the disc.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 is a perspective view of a part of the apparatus shown in Fig. 1;

Fig. 3 is a sectional view taken along line 3—3 of Fig. 1 in the direction of the arrows;

Fig. 4 is a fragmentary plan view of one scoring blade of the present invention;

Fig. 5 is a fragmentary end view of the apparatus of the present invention;

Figure 1:
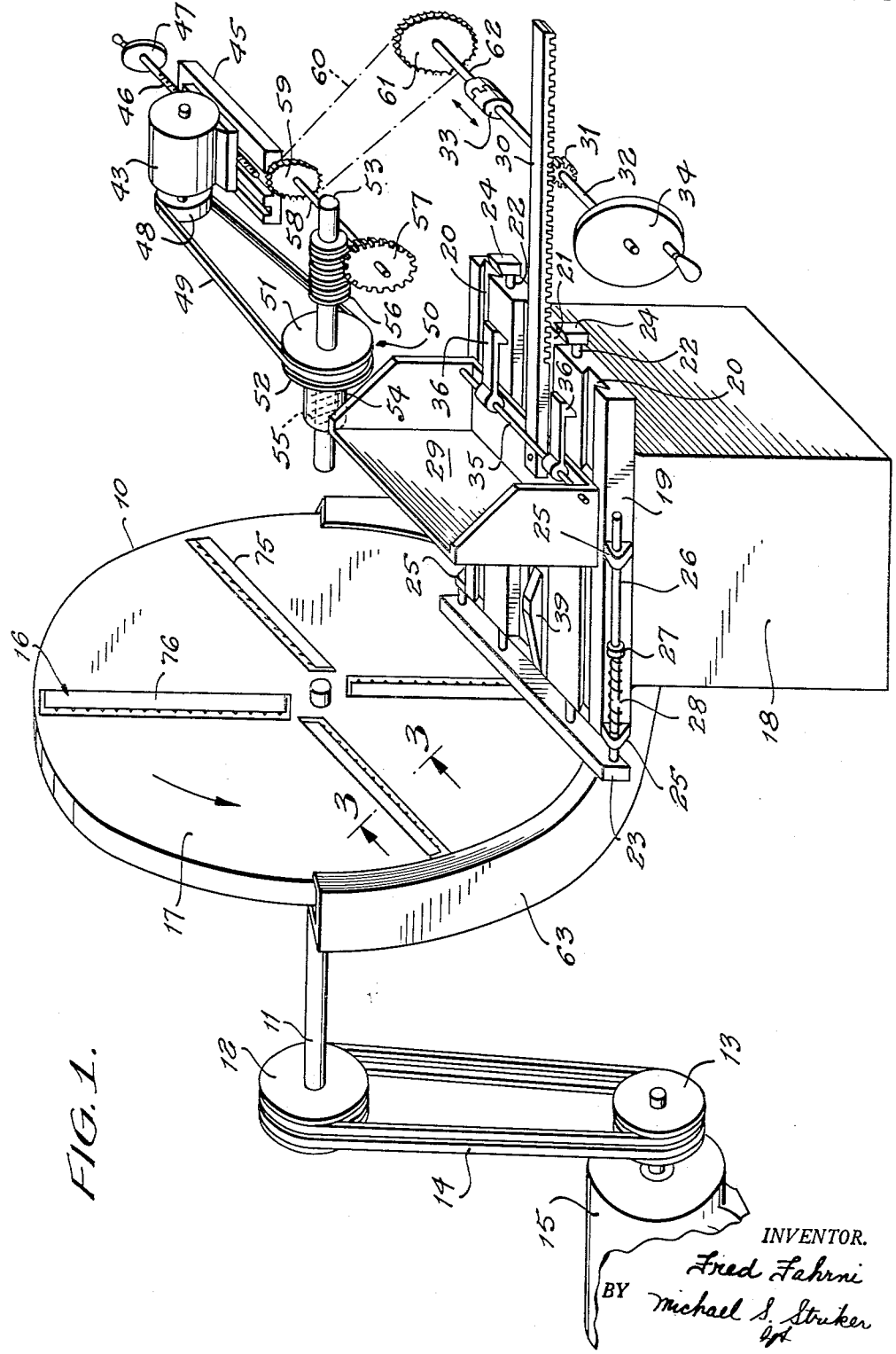
Fig. 1 shows a schematic, perspective view of one possible apparatus for carrying out the present invention.

Referring to Fig. 1 in the drawings, there is shown a perspective schematic view of one complete apparatus for carrying out the present invention. The disc 10 is fixedly mounted on the shaft 11 for rotation therewith, and the shaft 11 is fixedly connected to the V-pulleys 12 which are operatively connected to the V-pulleys 13 by the V-belts 14. The pulleys 13 are connected to and driven by the motor 15, and the disc 10 is rotated in the direction of the arrow shown in Fig. 1 through its interconnection with the motor 15 by the elements 11—14. Mounted on the disc 10 are a plurality of equally spaced cutting means 16, four in the particular example shown, which cut material fed to the disc into shavings. The details of the construction of cutting means 16 will be described below.

Mounted ahead of the front face 17 of the disc 10 is the table 18 which is provided with a table top 19. This table top 19 has a pair of spaced parallel dovetail grooves 20 which are parallel to the axis of rotation of disc 10. The table top 19 is also provided with a central groove 21 located between grooves 20 and being parallel thereto. Bars 22 are slidably mounted in a pair of bores which extend through the table top 19 in a direction parallel to the grooves 20, and each bar 22 supports and is connected at one end thereof to an extension 23 of the table top 19 which has a top surface at the same level as the top surface of table top 19. Connected to each of the opposite ends of the bars 22 is a catch member 24. On each opposite side of the table top 19 there are a pair of spaced lugs 25 which are apertured to slidably support the bars 26 fixedly connected at one end to the extension 23 and each having a washer 27 fixedly mounted thereon between the lugs 25. Springs 28 are respectively mounted about the bars 26 between the forward lug 25 and washer 27, as is apparent from Fig. 1, to urge the extension 23 in a direction away from the disc 10.

Mounted on the table top 19 is a feeding member 29 which has a pair of dovetail extensions extending from the lower surface thereof and respectively engaging the grooves 20, so that the feeding member 29 is guided by the grooves 20 for movement toward and away from the disc 10. As is apparent from Fig. 5, the feeding member 29 is located opposite the lower left quarter of the disc 10 and confronts face 17 thereof. Fixedly connected to the feeder member 29 is a rack 30 having downwardly extending teeth which mesh with a pinion 31 mounted on a shaft 32 only for rotation therewith. The shaft 32 may be mounted for rotation in apertured lugs (not shown), for example, which are fixedly supported in any suitable manner so as to permit the shaft 32 to be moved along its axis in the direction of the arrows shown adjacent to the clutch 33 which has one part thereof fixedly connected to an end of shaft 32. The pinion 31 is slidably keyed to the shaft 32 so that the latter may move along its axis with respect to pinion 31, while pinion 31 is constrained to rotate with shaft 32. Mounted on an end portion of shaft 32 opposite from clutch 33 is a hand wheel 34.

Feeder member 29 rotatably supports at a lower rear part thereof a shaft 35 which has fixedly connected thereto the hook members 36, and these latter hook members are located over the bars 22 and in alignment with the catch members 24.

Figure 6:
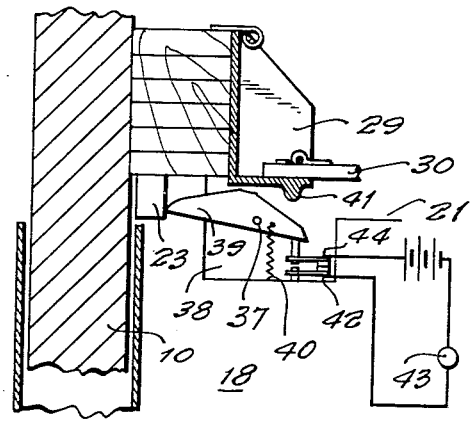
Fig. 6 is a diagrammatic view of a part of the apparatus of the present invention.

As is most clearly shown in Fig. 6, the table 18 is provided with a recess 38 at its front end, and this recess communicates with the central groove 21 in the table top 19. Shaft 37 extends across the recess 38 and pivotally supports the pawl member 39, which in the position shown in Fig. 6 is in engagement with the rear face of extension 23 so as to maintain the same adjacent the disc 10 against the action of springs 28. Spring 40 is connected at one end to the pawl 39 and at the other end to the table 18 so as to urge pawl 39 into the position shown in Fig. 6. The lower surface of feeder member 29 is provided with an actuating member 41 projecting therefrom and located in alignment with the pawl 39. The pawl 39 has an upwardly extending top surface which is engaged by actuating member 41, when feeder member 29 moves forward to a predetermined distance from disc 10, so as to be lowered about shaft 37 and in this way release extension 23 to the action of springs 28. Also mounted in recess 38 is an insulated electrical spring contact member 42 which is connected electrically to the motor 43. Mounted adjacent the rear end of pawl 39 is another insulated electrical spring contact member 44 which is in engagement with the contact member 42 when pawl 39 is in the position shown in Fig. 6 so as to complete the circuit to motor 43 and cause the latter to operate when the pawl 39 is in the position shown in Fig. 6.

The motor 43 is slidably mounted on a support 45 (Fig. 1) for movement in a direction substantially perpendicular to the axis of rotation of disc 10, and the screw member 46 with the hand wheel 47 connected thereto is mounted only for rotation on support 45 and engages a threaded part of the base of motor 43 so as to move the latter along the support 45. Motor 43 is connected to and drives a V-pulley 48 which drives the V-belt 49 that is operatively connected to the pulley means 50. The pulley means 50 comprises a pair of spaced discs 51 and 52 which have inner conical faces that converge towards each other in a direction toward the center of shaft 53 on which the discs 51 and 52 are mounted. The rotatable shaft 53 is mounted at its opposite ends in stationary bearings and has its axis substantially parallel to the axis of shaft 11. Disc 51 is fixedly mounted on shaft 53 so as to rotate the latter therewith, and disc 52 is slidably mounted on shaft 53. Disc 52 has a hollow hub 54 extending therefrom, and mounted in this hollow hub 54 is a spring 55 which is fixedly connected at one end to the shaft 53 and which bears with its other end against disc 52 so as to urge the latter toward disc 51. Fixedly mounted on shaft 53 for rotation therewith is the worm 56 which meshes with the worm wheel 57 which is fixedly mounted upon the rotatably supported shaft 58. Shaft 58 has fixedly connected thereto the sprocket wheel 59 which supports and drives the sprocket chain 60 guided over the sprocket wheel 61. Sprocket wheel 61 is fixedly connected to the rotatably supported shaft 62 which has fixedly mounted thereon the other part of clutch 33 which meshes with the part thereof connected to shaft 32.

The operation of the above-described apparatus is as follows:

Assuming that a plurality of pieces of wood are located over each other between the feeder member 29 and disc 10, as is shown diagrammatically in Fig. 6, and are being cut, the rotation of the disc 10 is derived from motor 15 and moves the cutting means 16 so as to cut the material, as was described above. The feeder member 29 is continually advanced at a desired rate towards the disc 16 through the medium of motor 43 which rotates discs 51 and 52 so as to rotate shaft 53 and worm 56. Worm 56 rotates the worm wheel 57 which rotates shaft 58 and sprocket wheel 59. Through the medium of chain 60, sprocket wheel 61 rotates with sprocket wheel 59 and causes shaft 62 to rotate. The clutch 33 being in its operative position at this time interconnects shaft 32 with shaft 62 so that pinion 31 is rotated to advance the rack 30 and feeder member 29 toward the disc 10.

As is apparent from Fig. 6, when the feeder member 29 has approached to a predetermined distance from the disc 10, the actuating member 41 will have depressed the pawl 39 against the action of spring 40 to such an extent that the springs 28 will retract the table top extension 23 from the disc 10, so that this table top extension 23 will be located over pawl 39 and maintain the same in this latter position against the action of spring 40. This movement of pawl 39 by actuating member 41 and the retraction of extension 23 by springs 28 cause contacts 42 and 44 to be separated so that motor 43 stops rotating and the feeder member 29 is no longer driven toward the disc 10. The dimensions of feeder member 29 are such that when extension 23 is retracted by springs 28 it is located behind the front face of feeder 29 so that it no longer supports the uncut portions of the material fed by feeder member 29.

Figure 7:
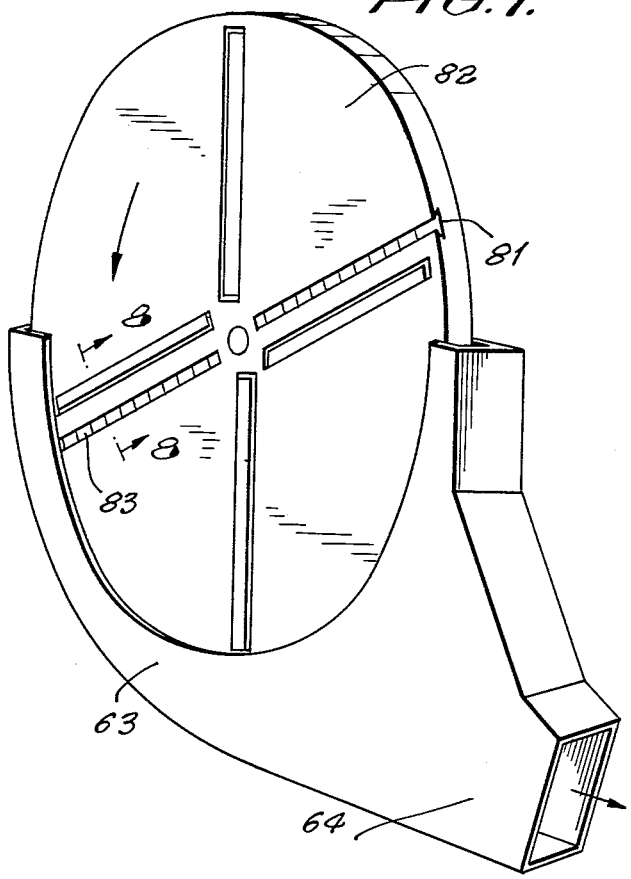
Fig. 7 is a view similar to Fig. 2 showing a different embodiment of the present invention.

Located beneath and about disc 10 is the hood member 63 which catches the shavings, and when extension 23 is thus retracted from disc 10 the uncut portions of the material fall to the floor. This hood 63 has a lower outlet end 64, shown in Figs. 2 and 7, from which the shavings are removed in the direction of the arrows shown in these figures. The hood 63 includes a removable plate member located over the lower half of disc 10 and connected to that part of hood 63 shown in Figs. 2 and 7 so as to direct the shavings to the outlet end 64.

When the material has been cut to the desired extent, as described above, and it is desired to set new material into the machine to be cut, the shaft 32 is pulled away from the shaft 62 so as to place the clutch 33 in its inoperative position, and hand wheel 34 is rotated so as to rotate pinion 41 and retract feeder member 29 from disc 10 through the medium of rack 30. The feeder member 29 is retracted until the hook members 36 slide with their lower inclined surfaces over the upper inclined surfaces of catch members 24, respectively, so that the latter are engaged by the hook members.

Material to be cut is then placed in front of feeder member 29 and hand wheel 34 is rotated in the opposite direction by the operator so as to move the material and feeder member 29 toward the disc 10. Due to the engagement of the hook member 36 with the catch members 24, the bars 22 will be moved forwardly and will thereby move the table top extension 23 toward the disc 10 so as to compress the springs 28. When extension 23 has moved forwardly by a distance great enough to clear pawl 39, the latter moves upwardly to the position shown in Fig. 6 under the action of spring 40. When this happens the operator manually raises the hooks 36 from the catch members 24 so as to discontinue the forward movement of extension 23, and the latter is held in its forward position by the pawl 39. Since the hooks 36 are both fixedly connected to the shaft 35, the operator need raise only one of these hooks so as to automatically raise the other one therewith. When pawl 39 is moved to the position shown in Fig. 6 by the spring 40, it automatically moves the contact 44 into engagement with the contact 42 so as to start the operation of the motor 43, but this latter does not yet drive the feed means because the clutch 33 is in its disengaged position. The operator then continues the forward movement of feeder member 29 until the material to be cut is located adjacent to the face 17 of disc 10.

It will be desirable to feed the material to be cut at different rates depending upon the type of material being cut, and in order to do this the hand wheel 47 is turned so as to rotate the screw member 46 and move motor 43 on its support 45 toward and away from the shaft 53. This will cause the V-belt 49 to be moved between the discs 51 and 52 which automatically engage the V-belt 49 due to the action of spring 55 which urges disc member 52 towards disc member 51. This engagement occurs in any selected position of V-belt 49 within the substantially wedge-shaped space defined between the discs 51 and 52. Thus, if the V-belt 49 is located adjacent the outer periphery of the discs 51 and 52, a relatively slow feed will be obtained, and if the V-belt 49 is located closer to the axis of shaft 53 a relatively fast feed will be obtained. When the position of motor 43 has thus been set (to so determine the position of V-belt 49 between discs 51 and 52 relative to the axes thereof in a constant manner), the shaft 32 is moved toward the shaft 62 so as to place the clutch 33 in its operative position by the engagement of the two parts thereof which are respectively connected to the adjacent ends of shafts 32 and 62. The motor 43 then moves the feeder member 29 toward the disc 17, and the latter is rotated by the motor 15 so as to automatically cut the material. If it should happen that the feeding of member 29 is at too fast a rate with respect to the rate at which the material is cut, which causes the material to be pushed against the face of disc 17, the V-belt 49 will slip due to the spring-pressed mounting of disc 52 slidably on shaft 53, and the apparatus will continue to operate and will not be damaged in any way. In addition to the above-described hood 63, another hood (not shown) is placed over the upper half of disc 10 and connected to hood 63 in any suitable manner.

The construction of the cutting means 16 may take various forms. In Fig. 3 there are shown the details of one form of the cutting means 16. As is apparent from Fig. 3, the disc 10 is provided with generally radial projections 65 on the rear face thereof, and screw threaded into threaded openings 66 in these projections are the screw members 67 which have bifurcated outer ends 68. Only one of the bifurcations of ends 68 of member 67 is shown in Fig. 3. Mounted for slidable movement in the bifurcated ends of screw members 67 are the screw members 69 which have integral washer-like projections 70 spaced from the heads thereof, so that the bifurcated end 68 of each screw member 67 is slidably engaged between the head and washer 70 of each screw member 69. Each screw member 69 is threadedly connected to a clamping member 71 which is provided with openings spaced along its length. When clamping member 71 is moved into the position shown in Fig. 3, these openings are located about the studs 72 which are fixedly connected to the projections 65 and pass through these openings. Nut 73 and washer 74 are mounted on each stud 72 so as to connect the clamping member 71 to the disc 10.

The disc 10 is formed with elongated slots 75 passing therethrough and respectively located on one side of the center of disc 10. These slots 75 are each parallel to and spaced from a radius of the disc 10. The inclined lower face of each projection 65, shown in Fig. 3, forms one of the sides of the slot 75 and the shaving blade 76 is mounted with one face thereof against the inclined lower face of each projection 65. The shaving blade 76 has a forward cutting edge 77 which is located in advance of the face 17 of the disc 10, and this distance between the face 17 and cutting edge 77 will generally determine the thickness of the shavings which are cut. In the particular embodiment which is illustrated in Fig. 3, a separate scoring blade 78 is mounted between the shaving blade 76 and the clamping member 71. As is apparent from Fig. 4, the scoring blade 78 includes a plurality of equally spaced groove-cutting projections 79, and these projections 79 extend forwardly of the cutting edge 77 so that they will first engage the material being cut. When the shaving blade 76 and scoring blade 78 are located in the desired position on the disc 10 the nut 73 is turned onto the stud 72 so that the clamping member 71 rigidly holds the shaving blade 76 and scoring blade 78 in the set position. The construction shown in Fig. 3 is identical in all four slots 75 of the disc 10, shown in Figs. 1 and 2.

Figure 8:
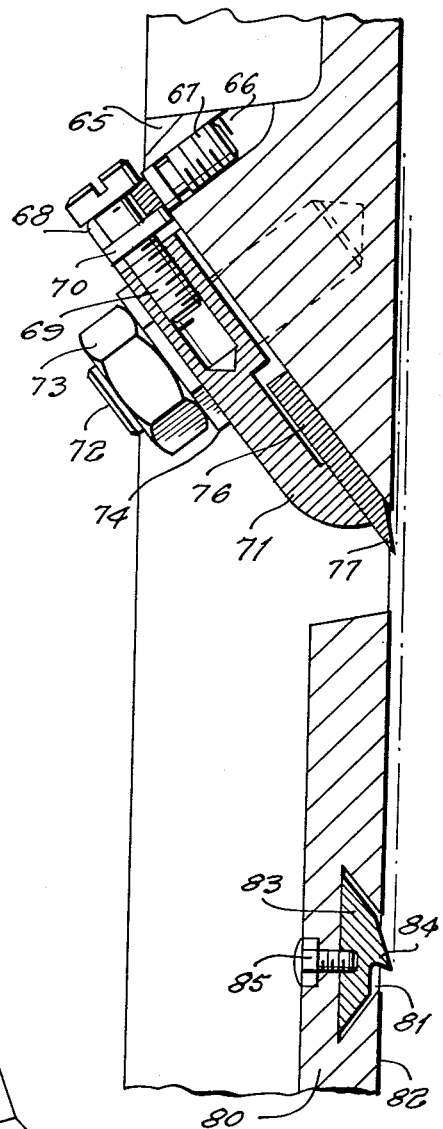
Fig. 8 is a sectional view taken along line 8—8 of Fig. 7 in the direction of the arrows.

Instead of mounting the scoring blade 78 in contact with the shaving blade 76, the latter may be supported by itself in the slot 75, as shown in Fig. 8, and the clamping member 71 may engage this shaving blade 76 by itself, as shown in Fig. 8. It will be noted that the clamping member 71 is located just slightly to the rear of the cutting edge 77 of shaving blades 76 so as to directly support the cutting edge of each blade 76.

In the embodiment of Fig. 8, the disc 80 is provided with dovetail grooves 81 located at about 180° from each other and opening onto the front face 82 of disc 80. Mounted in the grooves 81 are the scoring blades 83 which have groove cutting projections spaced therealong and extending further from the face 82 of disc 80 than the cutting edge 77. The scoring blades 83 are fixedly mounted in the disc 80 by means of screws 85 for example which pass through bores in disc 80 and engage threaded openings in the scoring blades 83. The sections shown in Figs. 3 and 8 are parts of the discs and cutting means which move downwardly and the parts are shown in position during the downward cutting movement thereof.

Instead of the scoring blade and shaving blade being made separate from each other, the two may be incorporated into one integral cutting means.

The manner in which the above-described cutting means produces the shavings is believed to be obvious. Since the scoring blades 83 and 78 have their groove cutting projections 84 and 79, respectively, located further from the front face of the discs than the cutting edge 77 of shaving blades 76 and located ahead of this cutting edge in the direction of rotation of the disc, the scoring blades will cut grooves in the material just before a layer of the same is shaved off by the shaving blades 76, and the width of the shavings will be determined by the distance between the respective groove cutting projections of the scoring blades. As a layer of material is cut by the cutting means, this layer curls under the clamping member 71, as shown in Figs. 3 and 8, and falls through the slots 75 into the hood 63 to be carried away through the outlet opening 64 thereof. The rotation of the discs 10 and 80 set up an air movement within the hood 63 which carries off the shavings. The thickness of the shavings obviously will be determined by the distance that the cutting edge 77 extends from the faces 82 and 17 of discs 80 and 10, respectively. While one of the dimensions of the shavings is determined by the spacing between the groove cutting projections of the scoring blades, the other dimension thereof is determined by the thickness of the pieces of material which are placed upon each other, as is apparent from Figs. 3, 6 and 8. When the material has been cut to the predetermined extent and the operation of the feeding member 29 is terminated, the remaining uncut portions of the material fall to the floor after retraction of extension 23. If desired, guide plates may be mounted on one or both sides of table top 19 to prevent the material being cut from moving laterally of the table top 19.

It will be understood that each of the elements described above, or two or more together, may also find a useful application in other types of process and apparatus for producing shavings differing from the types described above.

While the invention has been illustrated and described as embodied in a process and apparatus for producing shavings by first scoring grooves in the material being cut and then cutting a layer of material across these grooves, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for manufacturing shavings, comprising in combination, a rotatably mounted disc; feeding means located opposite a face of said disc for feeding material to be cut into shavings in a direction substantially parallel to the axis of rotation of said disc, said feeding means comprising a table top having mounting means and a movable extension located adjacent to said disc; spring means operatively connected to said extension and to said mounting means for urging the former away from said disc; cutting means mounted on said disc for cutting the material fed toward said disc by said feeding means; and control means operatively connected to said feeding means for automatically terminating the operation thereof when said feeding means is located at a predetermined distance from said disc, said control means comprising pawl means operatively engageable with said extension for releasably maintaining the same in a position adjacent to said disc against the action of said spring means, said pawl means being operatively linked to said control means for actuating the same upon movement of said pawl means; and actuating means operatively connected to said feeding means for moving said pawl means from said extension and to actuating position for said control means to terminate the operation of said feeding means simultaneously with the movement of said extension away from said disc by said spring means, whereby the remaining material falls from the table top.

2. In an apparatus as set forth in claim 1 wherein the rotatable mounted disc has slotted apertures therein and radial projections on the rear thereof, and said cutting means comprises a shaving blade and a scoring blade, said shaving blade and scoring blade being secured to said radial projections on said disc by a clamping member and extending through said apertures.

3. Apparatus for manufacturing shavings, comprising in combination, motor operated feeding means for positively and continuously feeding material to be cut into shavings along a predetermined path; and cutting and grooving means mounted for rotative movement in a direction and plane substantially perpendicular to and intersecting said predetermined path and comprising a cutter edge projecting a predetermined distance in a direction generally opposite to that of said predetermined path and a plurality of grooving projections extending a greater distance than said predetermined distance in said same general direction, said grooving projections being positioned anteriorly of said cutter edge when reckoned with respect to said direction of rotative movement for initially scoring a plurality of grooves of predetermined depth in the material and immediately thereafter cutting off a layer of the material of a thickness less than said depth across the grooves so as to produce shavings, and control means operatively connected to said feeding means for automatically terminating the operation thereof when said feeding means is located at a predetermined distance from said disc, said control means comprising a projection on said feeding means and a movable lever operatively connected to the motor, said lever operatively engageable by said projection, said projection on said feeding means contacting said movable lever when said feeding means advances to said predetermined distance and stops the motor and thereby stopping further advance of said feeding means.

4. In an apparatus as set forth in claim 3, a retractable element held in an extended position by said movable lever, and means for retracting said element upon engagement of said movable lever by said projection.

References Cited in the file of this patent

UNITED STATES PATENTS

| | | |
|---|---|---|
| 121,698 | Wilder | Dec. 5, 1871 |
| 747,827 | Wolfinger | Dec. 22, 1903 |
| 1,327,983 | Burrows | Jan. 13, 1920 |
| 1,342,925 | Rehrig | June 8, 1920 |
| 1,720,093 | Rehrig | July 9, 1929 |
| 2,130,457 | Fickett et al. | Sept. 20, 1938 |
| 2,269,352 | Bacon | Jan. 6, 1942 |